United States Patent
Kang

(10) Patent No.: US 10,152,985 B2
(45) Date of Patent: Dec. 11, 2018

(54) METHOD FOR RECORDING IN VIDEO CHAT, AND TERMINAL

(71) Applicant: Huawei Technologies Co., Ltd., Shenzhen (CN)

(72) Inventor: Junteng Kang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/536,550

(22) PCT Filed: Dec. 14, 2015

(86) PCT No.: PCT/CN2015/097250
§ 371 (c)(1),
(2) Date: Jun. 15, 2017

(87) PCT Pub. No.: WO2016/095773
PCT Pub. Date: Jun. 23, 2016

(65) Prior Publication Data
US 2017/0330581 A1 Nov. 16, 2017

(30) Foreign Application Priority Data
Dec. 15, 2014 (CN) .......................... 2014 1 0779109

(51) Int. Cl.
*H04N 7/14* (2006.01)
*G10L 21/0216* (2013.01)
(Continued)

(52) U.S. Cl.
CPC ........... *G10L 21/0216* (2013.01); *H04N 5/91* (2013.01); *H04N 7/15* (2013.01); *H04N 7/155* (2013.01);
(Continued)

(58) Field of Classification Search
None
See application file for complete search history.

(56) References Cited

U.S. PATENT DOCUMENTS 5,335,011 A * 8/1994 Addeo ................. H04N 7/15
348/14.1
2004/0257432 A1 12/2004 Girish et al.
(Continued)

FOREIGN PATENT DOCUMENTS

CN 102830964 A 12/2012
CN 102902505 A 1/2013
(Continued)

OTHER PUBLICATIONS

Machine Translation and Abstract of Chinese Publication No. CN103414988, Nov. 27, 2013, 7 pages.
(Continued)

*Primary Examiner* — Stella L. Woo
(74) *Attorney, Agent, or Firm* — Conley Rose, P.C.

(57) ABSTRACT

A method for recording in a video chat, and a terminal to reduce background noise and noise of multiple persons in a video chat process, and improve voice quality of a video chat. A first terminal divides a video calling screen into multiple angular domains. After beam configuration information of each angular domain is determined, beam configuration information of a target angular domain of the first terminal is sent to a second terminal. The second terminal performs, according to the beam configuration information, beamforming processing on an audio signal obtained through recording such that signal strength of an audio signal of the target angular domain is enhanced, and signal strength of an audio signal of another angular domain is attenuated.

18 Claims, 5 Drawing Sheets

(51) Int. Cl.

| | | |
|---|---|---|
| *H04N 21/439* | (2011.01) | |
| *H04N 21/4788* | (2011.01) | |
| *H04N 5/91* | (2006.01) | |
| *H04N 7/15* | (2006.01) | |
| *H04R 1/40* | (2006.01) | |
| *H04R 3/00* | (2006.01) | |

(52) U.S. Cl.
CPC ....... *H04N 21/439* (2013.01); *H04N 21/4788* (2013.01); *H04R 1/406* (2013.01); *H04R 3/005* (2013.01); *G10L 2021/02166* (2013.01); *H04R 2430/23* (2013.01)

(56) References Cited

U.S. PATENT DOCUMENTS

| | | |
|---|---|---|
| 2008/0134254 A1 | 6/2008 | Xia et al. |
| 2008/0259731 A1 | 10/2008 | Happonen |
| 2010/0254543 A1 | 10/2010 | Kjoelerbakken |
| 2012/0124602 A1* | 5/2012 | Tan .................. G09B 5/06 725/9 |
| 2013/0013303 A1 | 1/2013 | Strommer et al. |
| 2013/0028443 A1 | 1/2013 | Pance et al. |
| 2013/0034241 A1 | 2/2013 | Pandey et al. |
| 2013/0083944 A1 | 4/2013 | Kvist et al. |
| 2013/0177168 A1 | 7/2013 | Inha et al. |
| 2013/0287228 A1 | 10/2013 | Kallai et al. |
| 2014/0033037 A1 | 1/2014 | Xu et al. |
| 2014/0085538 A1 | 3/2014 | Kaine et al. |
| 2016/0142620 A1 | 5/2016 | Sawa et al. |

FOREIGN PATENT DOCUMENTS

| | | |
|---|---|---|
| CN | 103414988 A | 11/2013 |
| CN | 104008753 A | 8/2014 |
| EP | 2551763 A1 | 1/2013 |
| EP | 2690886 A1 | 1/2014 |
| JP | H08505745 A | 6/1996 |
| JP | 2007329753 A | 12/2007 |
| JP | 2013048412 A | 3/2013 |
| WO | 2013184299 A1 | 12/2013 |
| WO | 2014125835 A1 | 8/2014 |

OTHER PUBLICATIONS

Machine Translation and Abstract of Chinese Publication No. CN104008753, Aug. 27, 2014, 14 pages.
Foreign Communication From a Counterpart Application, PCT Application No. PCT/CN2015/097250, English Translation of International Search Report dated Mar. 15, 2016, 2 pages.
Foreign Communication From a Counterpart Application, PCT Application No. PCT/CN2015/097250, English Translation of Written Opinion dated Mar. 15, 2016, 6 pages.
Foreign Communication From a Counterpart Application, European Application No. 15869280.6, Extended European Search Report dated Oct. 23, 2017, 8 pages.
Machine Translation and Abstract of Japanese Publication No. JP2007329753, Dec. 20, 2007, 21 pages.
Machine Translation and Abstract of Japanese Publication No. JP2013048412, Mar. 7, 2013, 16 pages.
Machine Translation and Abstract of Japanese Publication No. JPH08505745, Jun. 18, 1996, 6 pages.
Foreign Communication From a Counterpart Application, Japanese Application No. 2017-549576, Japanese Notice of Allowance dated Jun. 11, 2018, 3 pages.

* cited by examiner

METHOD FOR RECORDING IN VIDEO CHAT, AND TERMINAL

CROSS-REFERENCE TO RELATED APPLICATIONS

This application is a U.S. National Stage of International Patent Application No. PCT/CN2015/097250 filed on Dec. 14, 2015, which claims priority to Chinese Patent Application No. 201410779109.X filed on Dec. 15, 2014. Both of the aforementioned applications are hereby incorporated by reference in their entireties.

TECHNICAL FIELD

The present disclosure relates to the field of communications technologies, and in particular, to a method for recording in a video chat, and a terminal.

BACKGROUND

Development of networks promotes changes of communication manners. A conventional communication manner can no longer satisfy people's requirements. From electronic mail (e-mail) to videotelephony, the networks make a communication speed improve and communication costs decrease. With popularization of broadband networks, people also have further requirements on network communication. Development of the broadband networks changes quality and a form of conventional network communication such that communication is no longer limited to ordinary languages and texts. It has become a popular manner that video chatting enables friends living far away from each other to meet each other, or that video chatting holds multi-party conference, or the like.

In the video chat, there are multiple terminals. A terminal that currently picks up a sound (or also referred to as recording) and sends the voice out is referred to as a second terminal. A terminal that currently waits to receive the sound sent by the second terminal is referred to as a first terminal. In a video chat scenario, especially in a multi-party conference, there may be multiple persons in front of the second terminal that participate in the video chat. To pick up voices of everyone in front of the second terminal, omnidirectional recording is usually used for the second terminal, that is, when a sound enters a microphone from 0 to 360 degrees and is then output, there is no obvious change in the sound.

However, in an actual application, if the omnidirectional recording is used, on one hand, the second terminal picks up excessive background noise, and on the other hand, when personnel participating in a video chat in front of the first terminal need to chat with one of multiple persons that participate in the video chat in front of the second terminal, the second terminal also picks up noise made by other persons, thereby seriously affecting voice quality of the video chat.

SUMMARY

Embodiments of the present disclosure provide a method for recording in a video chat, and a terminal in order to reduce background noise and noise of multiple persons in a video chat process, and improve voice quality of a video chat.

A first aspect of the embodiments of the present disclosure provides a method for recording in a video chat, including dividing, by a first terminal, a video calling screen into multiple angular domains, where the video calling screen is a screen that is displayed on the first terminal and that is used to perform video chatting with participants in front of a second terminal, determining, by the first terminal according to a location of each angular domain in the video calling screen, beam configuration information corresponding to each angular domain, where the beam configuration is an input parameter of a beamforming technology, sending, by the first terminal, beam configuration information corresponding to the target angular domain to the second terminal when the first terminal determines a target angular domain, where the target angular domain includes at least one of the multiple angular domains, receiving, by the second terminal, the beam configuration information that is sent by the first terminal and that corresponds to the target angular domain, performing, by the second terminal according to the beam configuration information, beamforming processing on an audio signal obtained through recording such that signal strength of an audio signal of the target angular domain is enhanced, and signal strength of an audio signal of another angular domain is attenuated in order to obtain a processed audio signal, and transmitting, by the second terminal, the processed audio signal to the first terminal.

With reference to the first aspect of the embodiments of the present disclosure, in a first implementation manner of the first aspect of the embodiments of the present disclosure, the second terminal includes at least two microphones, and performing, by the second terminal according to the beam configuration information, beamforming processing on an audio signal obtained through recording further includes adjusting, by the second terminal according to the beam configuration information, a parameter of an audio signal collected by each microphone such that after the audio signals collected by the microphones in the second terminal are synthesized, only the audio signal of the target angular domain exists.

With reference to the first aspect of the embodiments of the present disclosure, in a second implementation manner of the first aspect of the embodiments of the present disclosure, dividing, by a first terminal, a video calling screen into multiple angular domains includes dividing, by the first terminal, the video calling screen into multiple areas according to locations of the participants in the video calling screen such that each participant occupies one area, or equally dividing, by the first terminal, the video calling screen into multiple angular domains.

With reference to the first aspect of the embodiments of the present disclosure to the second implementation manner of the first aspect, in a third implementation manner of the first aspect of the embodiments of the present disclosure, the beam configuration information includes an acoustic source azimuth, a beam direction, and a beam width, and determining, by the first terminal according to a location of each angular domain in the video calling screen, beam configuration information corresponding to each angular domain includes calculating, by the first terminal according to the location of each angular domain in the video calling screen, an acoustic source azimuth, a beam direction, and a beam width that correspond to each angular domain, or obtaining through matching, by the first terminal according to the location of each angular domain in the video calling screen and preset configuration information, an acoustic source azimuth, a beam direction, and a beam width that correspond to each angular domain.

A second aspect of the embodiments of the present disclosure provides a method for recording in a video chat, including dividing, by a first terminal, a video calling screen into multiple angular domains, where the video calling screen is a screen that is displayed on the first terminal and that is used to perform video chatting with participants in front of a second terminal, determining, by the first terminal according to a location of each angular domain in the video calling screen, beam configuration information corresponding to each angular domain, where the beam configuration is an input parameter of a beamforming technology, and sending, by the first terminal, beam configuration information corresponding to the target angular domain to the second terminal when the first terminal determines a target angular domain such that the second terminal performs, according to the beam configuration information corresponding to the target angular domain, beamforming processing on an audio signal obtained through recording in order to enhance signal strength of an audio signal of the target angular domain, and attenuate signal strength of an audio signal of another angular domain, where the target angular domain includes at least one of the multiple angular domains.

With reference to the second aspect of the embodiments of the present disclosure, in a first implementation manner of the second aspect of the embodiments of the present disclosure, dividing, by a first terminal, a video calling screen into multiple angular domains includes dividing, by the first terminal, the video calling screen into multiple areas according to locations of the participants in the video calling screen such that each participant occupies one area, or equally dividing, by the first terminal, the video calling screen into multiple angular domains.

With reference to the second aspect of the embodiments of the present disclosure or the first implementation manner of the second aspect, in a second implementation manner of the second aspect of the embodiments of the present disclosure, the beam configuration information includes an acoustic source azimuth, a beam direction, and a beam width, and determining, by the first terminal according to a location of each angular domain in the video calling screen, beam configuration information corresponding to each angular domain includes calculating, by the first terminal according to the location of each angular domain in the video calling screen, an acoustic source azimuth, a beam direction, and a beam width that correspond to each angular domain, or obtaining through matching, by the first terminal according to the location of each angular domain in the video calling screen and preset configuration information, an acoustic source azimuth, a beam direction, and a beam width that correspond to each angular domain.

With reference to the second aspect of the embodiments of the present disclosure to the second implementation manner of the second aspect, in a third implementation manner of the second aspect of the embodiments of the present disclosure, before determining, by the first terminal, a target angular domain, the method further includes receiving, by the first terminal, information about at least one angular domain that is selected by a user from the multiple angular domains, and determining that the selected angular domain is the target angular domain.

A third aspect of the embodiments of the present disclosure provides a method for recording in a video chat, including receiving, by a second terminal, beam configuration information that is sent by a first terminal and that corresponds to a target angular domain in a video calling screen, where the beam configuration information is an input parameter of a beamforming technology, the video calling screen is a screen that is displayed on the first terminal and that is used to perform video chatting with participants in front of the second terminal, and the target angular domain includes at least one of multiple angular domains in the video calling screen, performing, by the second terminal according to the beam configuration information, beamforming processing on an audio signal obtained through recording such that signal strength of an audio signal of the target angular domain is enhanced, and signal strength of an audio signal of another angular domain is attenuated in order to obtain a processed audio signal, and transmitting, by the second terminal, the processed audio signal to the first terminal.

With reference to the third aspect of the embodiments of the present disclosure, in a first implementation manner of the third aspect of the embodiments of the present disclosure, the beam configuration information includes an acoustic source azimuth, a beam direction, and a beam width. The second terminal includes at least two microphones, and performing, by the second terminal according to the beam configuration information, beamforming processing on an audio signal obtained through recording further includes adjusting, by the second terminal according to the beam configuration information, a parameter of an audio signal collected by each microphone such that after the audio signals collected by the microphones in the second terminal are synthesized, only the audio signal of the target angular domain exists.

A fourth aspect of the embodiments of the present disclosure provides a terminal, which is used as a first terminal and is configured to record in a video chat, including a division module configured to divide a video calling screen into multiple angular domains, where the video calling screen is a screen that is displayed on the first terminal and that is used to perform video chatting with participants in front of a second terminal, a configuration determining module configured to determine, according to a location of each angular domain in the video calling screen, beam configuration information corresponding to each angular domain, where the beam configuration is an input parameter of a beamforming technology, and a configuration sending module configured to send beam configuration information corresponding to the target angular domain to the second terminal when a target angular domain is determined such that the second terminal performs, according to the beam configuration information corresponding to the target angular domain, beamforming processing on an audio signal obtained through recording in order to enhance signal strength of an audio signal of the target angular domain, and attenuate signal strength of an audio signal of another angular domain, where the target angular domain includes at least one of the multiple angular domains.

With reference to the fourth aspect of the embodiments of the present disclosure, in a first implementation manner of the fourth aspect of the embodiments of the present disclosure, the division module is further configured to divide the video calling screen into multiple areas according to locations of the participants in the video calling screen such that each participant occupies one area, or equally divide the video calling screen into multiple angular domains.

With reference to the fourth aspect of the embodiments of the present disclosure to the first implementation manner of the fourth aspect, in a second implementation manner of the fourth aspect of the embodiments of the present disclosure, the beam configuration information includes an acoustic source azimuth, a beam direction, and a beam width, and the configuration determining module is further configured to calculate, according to the location of each angular domain in the video calling screen, an acoustic source azimuth, a beam direction, and a beam width that correspond to each angular domain, or obtain through matching, according to the location of each angular domain in the video calling screen and preset configuration information, an acoustic source azimuth, a beam direction, and a beam width that correspond to each angular domain.

With reference to any one of the fourth aspect of the embodiments of the present disclosure or the second implementation manner of the fourth aspect, in a third implementation manner of the fourth aspect of the embodiments of the present disclosure, the terminal further includes an angular domain receiving module configured to receive information about at least one angular domain that is selected by a user from the multiple angular domains, and an angular domain determining module configured to determine, according to the information received by the angular domain receiving module, that the selected angular domain is the target angular domain.

A fifth aspect of the embodiments of the present disclosure provides a terminal, which is used as a second terminal and is configured to record in a video chat, including a configuration receiving module configured to receive beam configuration information that is sent by a first terminal and that corresponds to a target angular domain in a video calling screen, where the beam configuration information is an input parameter of a beamforming technology, the video calling screen is a screen that is displayed on the first terminal and that is used to perform video chatting with participants in front of the second terminal, and the target angular domain includes at least one of multiple angular domains in the video calling screen, a processing module configured to perform, according to the beam configuration information, beamforming processing on an audio signal obtained through recording such that signal strength of an audio signal of the target angular domain is enhanced, and signal strength of an audio signal of another angular domain is attenuated in order to obtain a processed audio signal, and a transmission module configured to transmit the audio signal processed by the processing module to the first terminal.

With reference to the fifth aspect of the embodiments of the present disclosure, in a first implementation manner of the fifth aspect of the embodiments of the present disclosure, the beam configuration information includes an acoustic source azimuth, a beam direction, and a beam width. The terminal includes at least two microphones, and the processing module is further configured to adjust, according to the beam configuration information, a parameter of an audio signal collected by each microphone such that after the audio signals collected by the microphones in the second terminal are synthesized, only the audio signal of the target angular domain exists in order to obtain the processed audio signal.

As can be seen from the foregoing technical solutions, the embodiments of the present disclosure have the following advantages. In the embodiments of the present disclosure, a first terminal divides a video calling screen into multiple angular domains. After determining beam configuration information of each angular domain, the first terminal sends beam configuration information of a target angular domain of the first terminal to a second terminal. The second terminal performs, according to the beam configuration information, beamforming processing on an audio signal obtained through recording such that signal strength of an audio signal of the target angular domain is enhanced, and signal strength of an audio signal of another angular domain is attenuated, thereby avoiding impact of a sound of another angular domain on a sound of the target angular domain, reducing background noise and noise of multiple persons in a video chat process, and improving voice quality of a video chat.

BRIEF DESCRIPTION OF DRAWINGS

FIG. 10 is another schematic structural diagram of a terminal according to an embodiment of the present disclosure; and FIG. 11 is a schematic structural diagram of a recording system according to an embodiment of the present disclosure.

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by persons skilled in the art based on the embodiments of the present disclosure without creative efforts shall fall within the protection scope of the present disclosure.

It should be understood that although various terminals may be described using terms such as first and second in the embodiments of the present disclosure, the terminals should not be limited to these terms. These terms are merely used to distinguish the terminals from one another. For example, without departing from the scope of the embodiments of the present disclosure, a first terminal may also be referred to as a second terminal. Similarly, a second terminal may also be referred to as a first terminal, likewise, the second terminal may also be referred to as a third terminal, and so on, which is not limited in the embodiments of the present disclosure.

The term "beamforming", which may also be referred to as spatial filtering, is a signal processing technology of directionally sending and receiving signals using a sensor array. In a beamforming technology, a parameter of a basic unit of a phase array is adjusted such that signals of some angles obtain constructive interference, and signals of some other angles obtain destructive interference. The beamforming may be applied to a signal transmit end and also may be applied to a signal receive end. At the transmit end, a beamformer controls a phase and a signal amplitude of each transmitting apparatus in order to obtain a required pattern of the constructive and destructive interference from a transmitted signal wave array. At the receive end, signals received by different receivers are combined in a proper manner in order to obtain an expected signal radiation pattern.

It may be understood that a method for recording in a video chat may be executed by two types of execution bodies. It is set that one type is a first terminal configured to control a recording direction, and the other type is a second terminal configured to record a sound.

Figure 1:
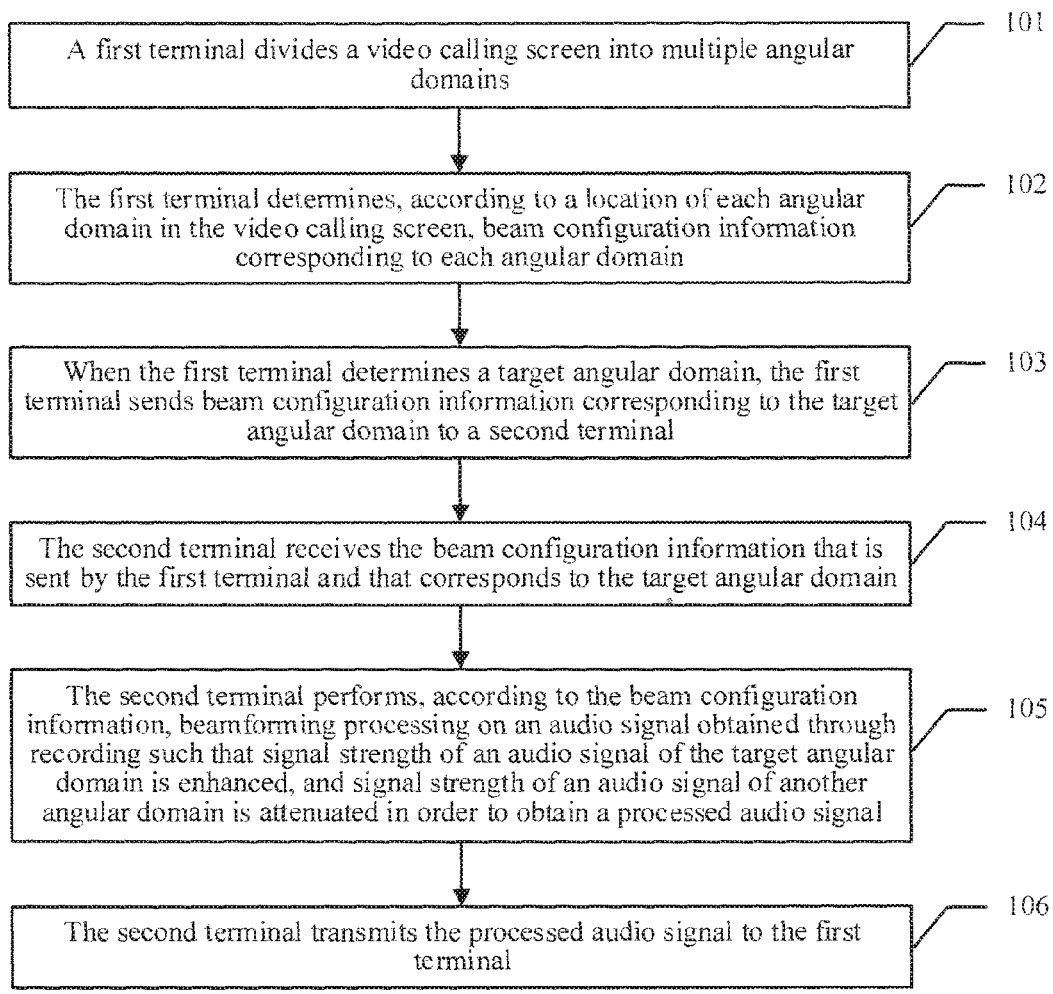
FIG. 1 is a schematic flowchart of a method for recording in a video chat according to an embodiment of the present disclosure.

Referring to FIG. 1, an embodiment of a method for recording in a video chat according to an embodiment of the present disclosure includes the following steps.

Step 101: A first terminal divides a video calling screen into multiple angular domains.

The first terminal divides the video calling screen into multiple angular domains when the first terminal has a video call with a second terminal. The video calling screen is a screen that is displayed on the first terminal and that is used to perform video chatting with participants in front of the second terminal.

Step 102: The first terminal determines, according to a location of each angular domain in the video calling screen, beam configuration information corresponding to each angular domain.

After dividing the video calling screen into multiple angular domains, the first terminal determines, according to the location of each angular domain in the video calling screen, the beam configuration information corresponding to each angular domain. The beam configuration information is an input parameter of a beamforming technology.

Step 103: When the first terminal determines a target angular domain, the first terminal sends beam configuration information corresponding to the target angular domain to the second terminal.

In a video call process, the first terminal may determine the target angular domain in the multiple angular domains. The first terminal sends the beam configuration information corresponding to the target angular domain to the second terminal when the first terminal determines the target angular domain. The target angular domain may include at least one of the multiple angular domains.

Step 104: The second terminal receives the beam configuration information that is sent by the first terminal and that corresponds to the target angular domain.

The second terminal receives the beam configuration information that is sent by the first terminal and that corresponds to the target angular domain when the first terminal sends the beam configuration information corresponding to the target angular domain to the second terminal.

Step 105: The second terminal performs, according to the beam configuration information, beamforming processing on an audio signal obtained through recording such that signal strength of an audio signal of the target angular domain is enhanced, and signal strength of an audio signal of another angular domain is attenuated in order to obtain a processed audio signal.

After receiving the beam configuration information, the second terminal performs, according to the beam configuration information, beamforming processing on the audio signal obtained through recording such that the signal strength of the audio signal of the target angular domain is enhanced, and the signal strength of the audio signal of another angular domain is attenuated in order to obtain the processed audio signal.

Step 106: The second terminal transmits the processed audio signal to the first terminal.

After obtaining the processed audio signal, the second terminal transmits the processed audio signal to the first terminal such that the signal strength, obtained by the first terminal, of the audio signal of the target angular domain is enhanced, and the signal strength of the audio signal of another angular domain is attenuated.

In this embodiment of the present disclosure, a first terminal divides a video calling screen into multiple angular domains. After beam configuration information of each angular domain is determined, the first terminal sends beam configuration information of a target angular domain of the first terminal to a second terminal. The second terminal performs, according to the beam configuration information, beamforming processing on an audio signal obtained through recording such that signal strength of an audio signal of the target angular domain is enhanced, and signal strength of an audio signal of another angular domain is attenuated, thereby avoiding impact of a sound of another angular domain on a sound of the target angular domain, reducing background noise and noise of multiple persons in a video chat process, and improving voice quality of a video chat.

Figure 2:
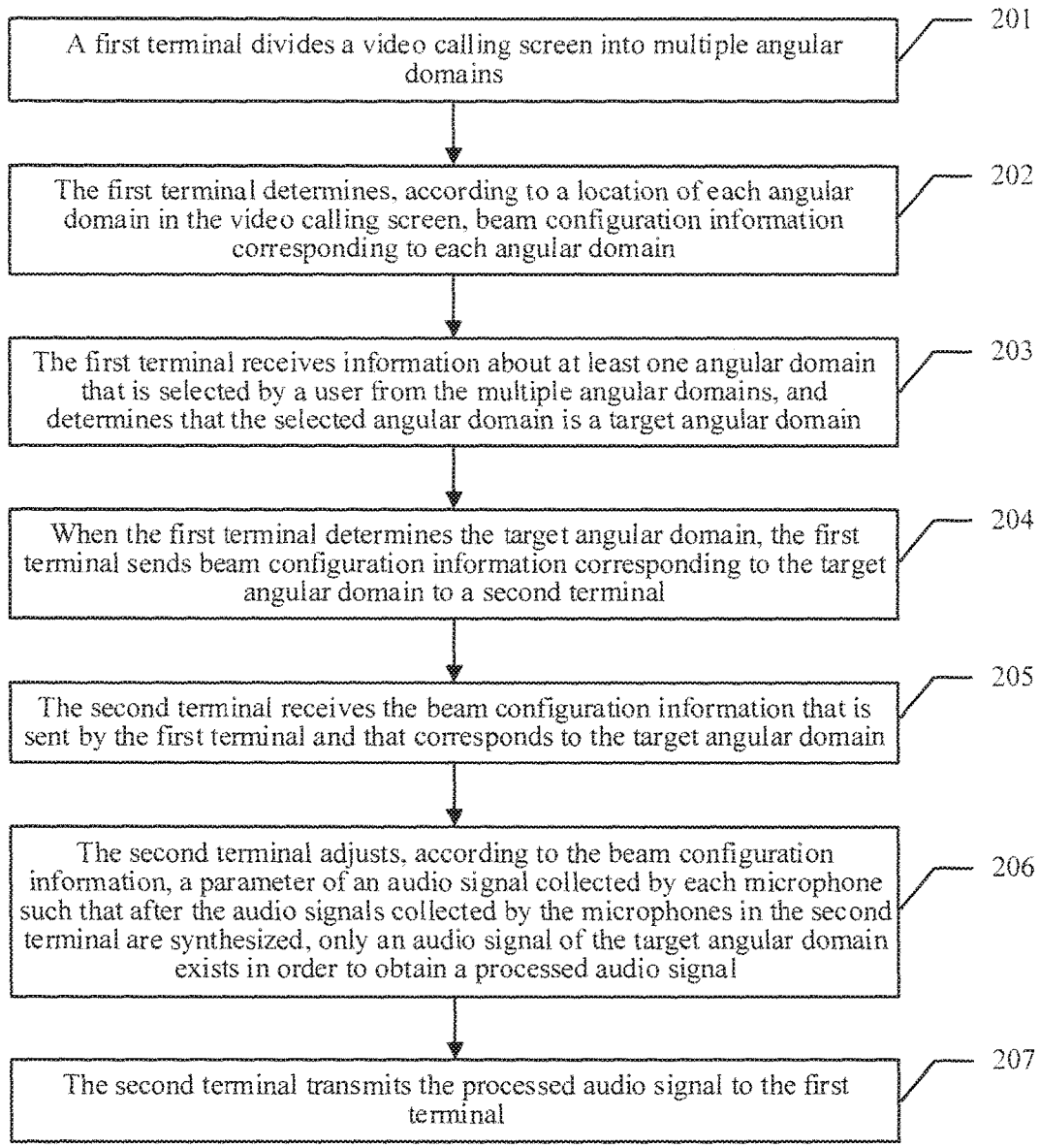
FIG. 2 is another schematic flowchart of a method for recording in a video chat according to an embodiment of the present disclosure.

A method for recording in a video chat according to an embodiment of the present disclosure is described in detail below. Referring to FIG. 2, another embodiment of the method for recording in a video chat according to this embodiment of the present disclosure includes the following steps.

Step 201: A first terminal divides a video calling screen into multiple angular domains.

The first terminal divides the video calling screen into multiple angular domains when the first terminal has a video call with a second terminal. The video calling screen is a screen that is displayed on the first terminal and that is used to perform video chatting with participants in front of the second terminal.

It may be understood that there are many manners in which the first terminal divides the video calling screen into multiple angular domains. For example, the first terminal may divide the video calling screen into multiple areas according to locations of the participants in the video calling screen such that each participant occupies one area. In this way, recording can be controlled more accurately in order to obtain a sound of a direction corresponding to each participant. In addition, the first terminal may equally divide the video calling screen into multiple angular domains. A quantity of angular domains obtained through equal division may be determined according to a quantity of the participants or according to resolution of the video calling screen such that beam configuration information of each angular domain is more conveniently calculated. Alternatively, there may be another division manner, which is not limited herein.

Step 202: The first terminal determines, according to a location of each angular domain in the video calling screen, beam configuration information corresponding to each angular domain.

After dividing the video calling screen into multiple angular domains, the first terminal determines, according to the location of each angular domain in the video calling screen, the beam configuration information corresponding to each angular domain. The beam configuration information is an input parameter of a beamforming technology.

The beam configuration information includes an acoustic source azimuth, a beam direction, and a beam width. The beam configuration information may further include a parameter such as a sampling rate, an inter-microphone distance, or a maximum noise reduction amount, which is not limited herein.

It may be understood that there may be many manners in which the beam configuration information corresponding to each angular domain is determined. After obtaining the location of each angular domain in the video calling screen, the first terminal may obtain through calculation according to the location of each angular domain in the video calling screen terminal, an acoustic source azimuth, a beam direction, and a beam width that correspond to each angular domain. In an actual application, preset configuration information may further exist. The preset configuration information stores a correspondence between each location in the video calling screen and beam configuration information. The first terminal may directly obtain through matching according to the location of each angular domain in the video calling screen and the preset configuration information, other parameters in the beam configuration information such as the acoustic source azimuth, the beam direction, and the beam width that correspond to each angular domain. Alternatively, there may be another manner of determining the beam configuration information corresponding to each angular domain, which is not limited herein.

Step 203: The first terminal receives information about at least one angular domain that is selected by a user from the multiple angular domains, and determines that the selected angular domain is the target angular domain.

The user may select at least one angular domain from the angular domains obtained through division of the video calling screen. In this case, the first terminal receives the information about at least one of the multiple angular domains, and determines that the selected angular domain is the target angular domain.

It may be understood that an angular domain may be selected by means of a finger touch and control, by means of a key input, by means of a floating touch and control, or the like, which is not limited herein.

Step 204: When the first terminal determines the target angular domain, the first terminal sends beam configuration information corresponding to the target angular domain to the second terminal.

The first terminal sends the beam configuration information corresponding to the target angular domain to the second terminal when the first terminal determines the target angular domain.

Step 205: The second terminal receives the beam configuration information that is sent by the first terminal and that corresponds to the target angular domain.

In a video call process, the second terminal receives the beam configuration information that is sent by the first terminal and that corresponds to the target angular domain.

Step 206: The second terminal adjusts, according to the beam configuration information, a parameter of an audio signal collected by each microphone such that after the audio signals collected by the microphones in the second terminal are synthesized, only an audio signal of the target angular domain exists in order to obtain a processed audio signal.

The second terminal includes at least two microphones. After receiving the beam configuration information, the second terminal adjusts, according to the beam configuration information, the parameter of the audio signal collected by each microphone such that after the audio signals collected by the microphones in the second terminal are synthesized, only the audio signal of the target angular domain exists in order to obtain the processed audio signal.

It may be understood that only the audio signal of the target angular domain exists in the processed audio signal, and an audio signal of another angular domain is attenuated to be less than a particular threshold, and it may be considered that the audio signal of the other angular domain does not exist.

Step 207: The second terminal transmits the processed audio signal to the first terminal.

After obtaining the processed audio signal, the second terminal transmits the processed audio signal to the first terminal such that the first terminal obtains the audio signal of the target angular domain. Audio signals of other angular domains are all attenuated and can be hardly recognized.

In this embodiment of the present disclosure, the first terminal may divide a video calling screen into multiple areas according to locations of participants in the video calling screen such that each participant occupies one area. In this way, beam configuration information of a direction corresponding to each participant can be obtained more accurately, and the beam configuration information is sent to a second terminal such that a sound of the direction corresponding to each participant can be obtained more accurately, thereby further reducing background noise and noise of multiple persons in a video chat process, and improving voice quality of a video chat.

For convenience of understanding, the method for recording in a video chat in this embodiment of the present disclosure is further described below using a specific application scenario.

An interviewer in front of a terminal A interviews three job applicants (in an order from left to right: a job applicant 1, a job applicant 2, and a job applicant 3) in front of a terminal B using the terminal A.

Video chatting is performed between the terminal A and the terminal B, and an image of the three job applicants is displayed in a video calling screen of the terminal A.

The terminal A divides the video calling screen into three angular domains according to locations of the three job applicants in the image, and each job applicant occupies one angular domain thereof.

The terminal A calculates, according to information about the three angular domains obtained through division, beam configuration information corresponding to the three angular domains.

A user clicks a middle angular domain with a mouse. The terminal A receives this operation, determines that the clicked angular domain is a target angular domain, and sends beam configuration information corresponding to the target angular domain to the terminal B.

The terminal B adjusts, according to the beam configuration information, a parameter of an audio signal collected by a microphone such that after sounds obtained through recording by the terminal B are synthesized, only a sound of the target angular domain finally exists. The terminal B transmits a processed sound to the terminal A.

In this case, the terminal A receives only a sound made from a direction in which the target angular domain is located (that is, the job applicant 2). A method for recording in a video chat according to an embodiment of the present disclosure is described below separately from perspectives of two types of execution bodies, a first terminal and a second terminal.

1. The method for recording in a video chat according to this embodiment of the present disclosure is described from a perspective of the first terminal.

Figure 3:
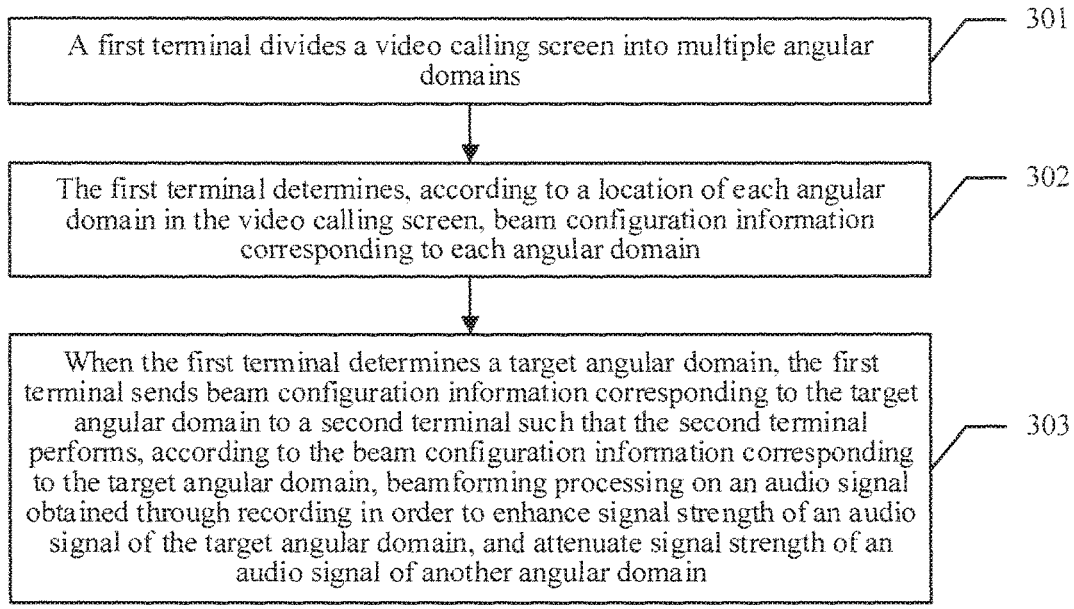
FIG. 3 is another schematic flowchart of a method for recording in a video chat according to an embodiment of the present disclosure.

Referring to FIG. 3, an embodiment of the method for recording in a video chat according to this embodiment of the present disclosure includes the following steps.

Step 301: A first terminal divides a video calling screen into multiple angular domains.

The first terminal divides the video calling screen into multiple angular domains when the first terminal has a video call with a second terminal. The video calling screen is a screen that is displayed on the first terminal and that is used to perform video chatting with participants in front of the second terminal.

Step 302: The first terminal determines, according to a location of each angular domain in the video calling screen, beam configuration information corresponding to each angular domain.

After dividing the video calling screen into multiple angular domains, the first terminal determines, according to the location of each angular domain in the video calling screen, the beam configuration information corresponding to each angular domain. The beam configuration information is an input parameter of a beamforming technology.

Step 303: When the first terminal determines a target angular domain, the first terminal sends beam configuration information corresponding to the target angular domain to the second terminal such that the second terminal performs, according to the beam configuration information corresponding to the target angular domain, beamforming processing on an audio signal obtained through recording in order to enhance signal strength of an audio signal of the target angular domain, and attenuate signal strength of an audio signal of another angular domain, where the target angular domain includes at least one of the multiple angular domains.

In a video call process, the first terminal may determine the target angular domain in the multiple angular domains. The first terminal sends the beam configuration information corresponding to the target angular domain to the second terminal when the first terminal determines the target angular domain such that the second terminal performs, according to the beam configuration information corresponding to the target angular domain, beamforming processing on the audio signal obtained through recording in order to enhance the signal strength of the audio signal of the target angular domain, and attenuate the signal strength of the audio signal of another angular domain.

In this embodiment of the present disclosure, a first terminal divides a video calling screen into multiple angular domains. After beam configuration information of each angular domain is determined, the first terminal sends beam configuration information of a target angular domain of the first terminal to a second terminal such that the second terminal performs, according to the beam configuration information corresponding to the target angular domain, beamforming processing on an audio signal obtained through recording in order to enhance signal strength of an audio signal of the target angular domain, and attenuate signal strength of an audio signal of another angular domain, thereby avoiding impact of a sound of another angular domain on a sound of the target angular domain, reducing background noise and noise of multiple persons in a video chat process, and improving voice quality of a video chat.

Figure 4:
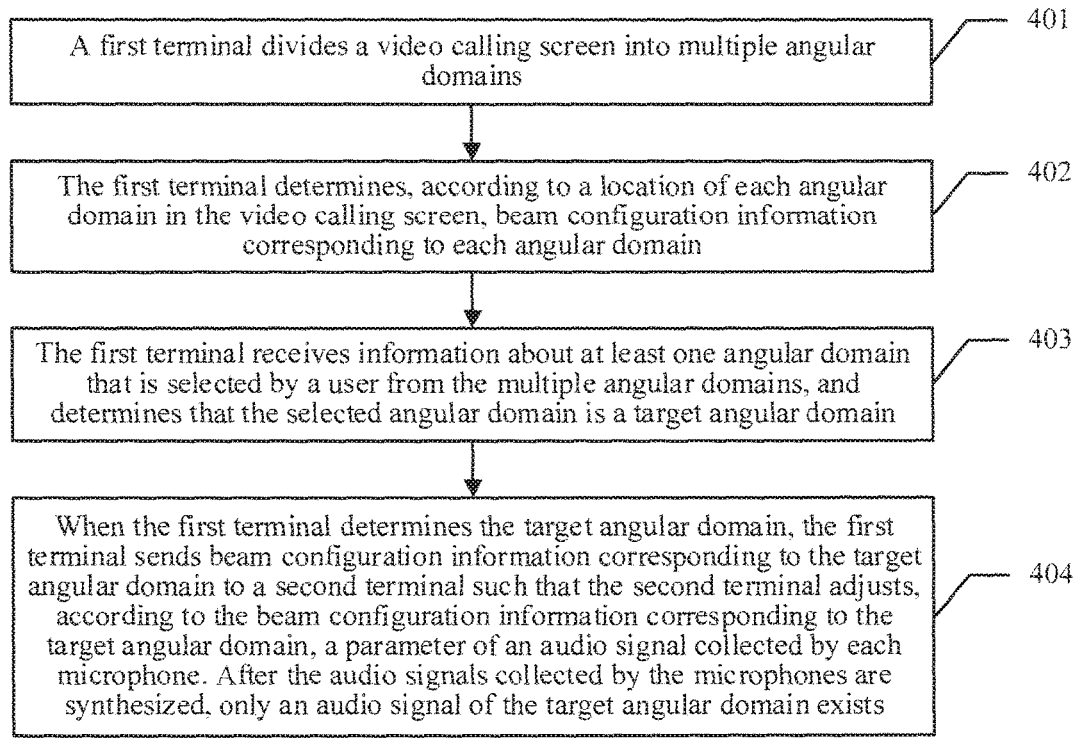
FIG. 4 is another schematic flowchart of a method for recording in a video chat according to an embodiment of the present disclosure.

A method for recording in a video chat according to an embodiment of the present disclosure is further described below. Referring to FIG. 4, another embodiment of the method for recording in a video chat according to this embodiment of the present disclosure includes the following steps.

Step 401: A first terminal divides a video calling screen into multiple angular domains.

The first terminal divides the video calling screen into multiple angular domains when the first terminal has a video call with a second terminal. The video calling screen is a screen that is displayed on the first terminal and that is used to perform video chatting with participants in front of the second terminal.

It may be understood that there are many manners in which the first terminal divides the video calling screen into multiple angular domains. For example, the first terminal may divide the video calling screen into multiple areas according to locations of participants in the video calling screen such that each participant occupies one area. In this way, recording can be controlled more accurately in order to obtain a sound of a direction corresponding to each participant. In addition, the first terminal may equally divide the video calling screen into multiple angular domains. A quantity of angular domains obtained through equal division may be determined according to a quantity of the participants or according to resolution of the video calling screen such that beam configuration information of each angular domain is more conveniently calculated. Alternatively, there may be another division manner, which is not limited herein.

Step 402: The first terminal determines, according to a location of each angular domain in the video calling screen, beam configuration information corresponding to each angular domain.

After dividing the video calling screen into multiple angular domains, the first terminal determines, according to the location of each angular domain in the video calling screen, the beam configuration information corresponding to each angular domain. The beam configuration information is an input parameter of a beamforming technology.

The beam configuration information includes an acoustic source azimuth, a beam direction, and a beam width. The beam configuration information may further include a parameter such as a sampling rate, an inter-microphone distance, or a maximum noise reduction amount, which is not limited herein.

It may be understood that there may be many manners in which the beam configuration information corresponding to each angular domain is determined. After obtaining the location of each angular domain in the video calling screen, the first terminal may obtain through calculation according to the location of each angular domain in the video calling screen terminal, an acoustic source azimuth, a beam direction, and a beam width that correspond to each angular domain. In an actual application, preset configuration information may further exist. The preset configuration information stores a correspondence between each location in the video calling screen and beam configuration information. The first terminal may directly obtain through matching according to the location of each angular domain in the video calling screen and the preset configuration information, other parameters in the beam configuration information such as the acoustic source azimuth, the beam direction, and the beam width that correspond to each angular domain. Alternatively, there may be another manner of determining the beam configuration information corresponding to each angular domain, which is not limited herein.

Step 403: The first terminal receives information about at least one angular domain that is selected by a user from the multiple angular domains, and determines that the selected angular domain is the target angular domain.

The user may select at least one angular domain from the angular domains obtained through division of the video calling screen. In this case, the first terminal receives the information about at least one of the multiple angular domains, and determines that the selected angular domain is the target angular domain.

It may be understood that an angular domain may be selected by means of a finger touch and control, by means of a key input, by means of a floating touch and control, or the like, which is not limited herein.

Step 404: When the first terminal determines the target angular domain, the first terminal sends the beam configuration information corresponding to the target angular domain to the second terminal such that the second terminal adjusts, according to the beam configuration information corresponding to the target angular domain, a parameter of an audio signal collected by each microphone. After the audio signals collected by the microphones are synthesized, only an audio signal of the target angular domain exists.

In this embodiment of the present disclosure, the first terminal may divide a video calling screen into multiple areas according to locations of participants in the video calling screen such that each participant occupies one area. In this way, beam configuration information of a direction corresponding to each participant can be obtained more accurately, and the beam configuration information is sent to a second terminal such that a sound of the direction corresponding to each participant can be obtained more accurately, thereby further reducing background noise and noise of multiple persons in a video chat process, and improving voice quality of a video chat.

2. The method for recording in a video chat according to this embodiment of the present disclosure is described from a perspective of the second terminal.

Figure 5:
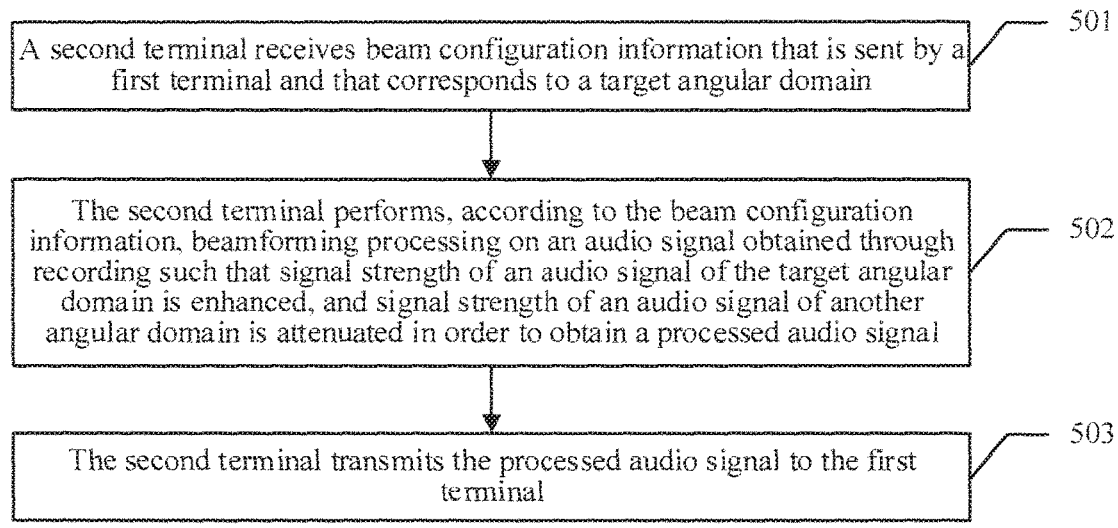
FIG. 5 is another schematic flowchart of a method for recording in a video chat according to an embodiment of the present disclosure.

Referring to FIG. 5, another embodiment of the method for recording in a video chat according to this embodiment of the present disclosure includes the following steps.

Step 501: A second terminal receives beam configuration information that is sent by a first terminal and that corresponds to a target angular domain.

Step 502: The second terminal performs, according to the beam configuration information, beamforming processing on an audio signal obtained through recording such that signal strength of an audio signal of the target angular domain is enhanced, and signal strength of an audio signal of another angular domain is attenuated in order to obtain a processed audio signal.

Step 503: The second terminal transmits the processed audio signal to the first terminal.

The foregoing steps 501 to 503 are similar to steps 104 to 106. Details are not described herein again.

In this embodiment of the present disclosure, a second terminal performs, according to received beam configuration information that is sent by a first terminal and that corresponds to a target angular domain, beamforming processing on an audio signal obtained through recording such that signal strength of an audio signal of the target angular domain is enhanced, and signal strength of an audio signal of another angular domain is attenuated, thereby reducing background noise and noise of multiple persons in a video chat process, and improving voice quality of a video chat.

Figure 6:
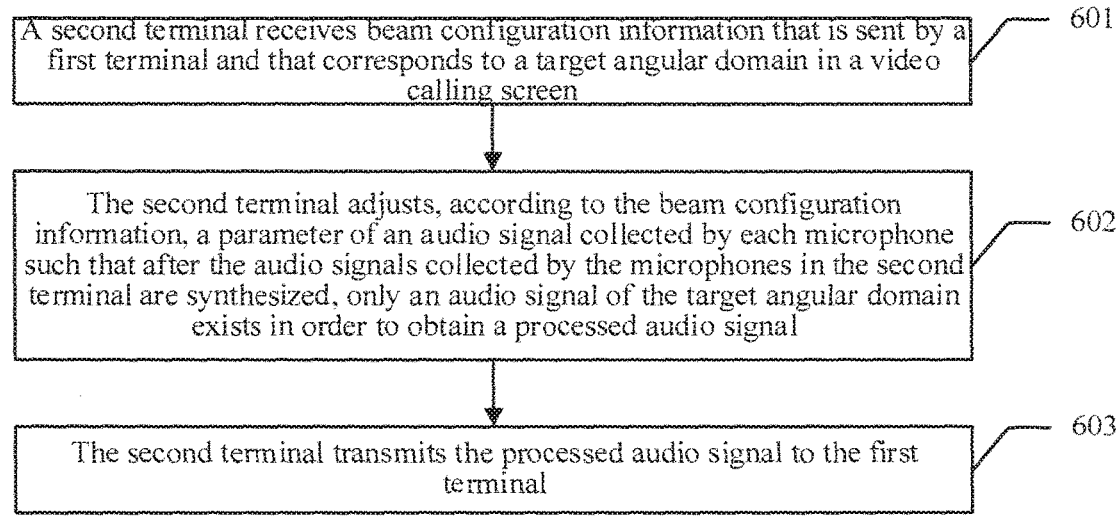
FIG. 6 is another schematic flowchart of a method for recording in a video chat according to an embodiment of the present disclosure.

A method for recording in a video chat according to an embodiment of the present disclosure is further described below. Referring to FIG. 6, another embodiment of the method for recording in a video chat according to this embodiment of the present disclosure includes the following steps.

Step 601: A second terminal receives beam configuration information that is sent by a first terminal and that corresponds to a target angular domain in a video calling screen.

Step 602: The second terminal adjusts, according to the beam configuration information, a parameter of an audio signal collected by each microphone such that after the audio signals collected by the microphones in the second terminal are synthesized, only an audio signal of the target angular domain exists in order to obtain a processed audio signal.

Step 603: The second terminal transmits the processed audio signal to the first terminal.

The foregoing steps 601 to 603 are similar to step 205 to step 207. Details are not described herein again.

In this embodiment of the present disclosure, the second terminal can adjust, according to beam configuration information using a beamforming technology, a parameter of an audio signal collected by each microphone such that after the audio signals obtained through recording by the microphones in the second terminal are synthesized, and after the audio signals collected by the microphones in the second terminal are synthesized, only an audio signal of the target angular domain exists, thereby accurately achieving effects of reducing background noise and noise of multiple persons in a video chat process, and improving voice quality of a video chat.

A terminal used as a first terminal in an embodiment of the present disclosure is described below.

Figure 7:
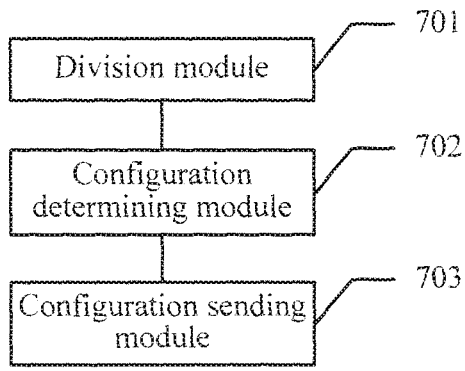
FIG. 7 is a schematic structural diagram of a terminal according to an embodiment of the present disclosure.

Referring to FIG. 7, an embodiment of the terminal according to this embodiment of the present disclosure includes a division module 701 configured to divide a video calling screen into multiple angular domains, where the video calling screen is a screen that is displayed on the first terminal and that is used to perform video chatting with participants in front of a second terminal, a configuration determining module 702 configured to determine, according to a location of each angular domain in the video calling screen, beam configuration information corresponding to each angular domain, where the beam configuration is an input parameter of a beamforming technology, and a configuration sending module 703 configured to send beam configuration information corresponding to the target angular domain to the second terminal when a target angular domain is determined such that the second terminal performs, according to the beam configuration information corresponding to the target angular domain, beamforming processing on an audio signal obtained through recording in order to enhance signal strength of an audio signal of the target angular domain, and attenuate signal strength of an audio signal of another angular domain, where the target angular domain includes at least one of the multiple angular domains.

In this embodiment of the present disclosure, the division module 701 divides a video calling screen into multiple angular domains. After the configuration determining module 702 determines beam configuration information of each angular domain, the configuration sending module 703 sends beam configuration information of a target angular domain of the first terminal to a second terminal such that the second terminal performs, according to the beam configuration information corresponding to the target angular domain, beamforming processing on an audio signal obtained through recording in order to enhance signal strength of an audio signal of the target angular domain, and attenuate signal strength of an audio signal of another angular domain, thereby avoiding impact of a sound of another angular domain on a sound of the target angular domain, reducing background noise and noise of multiple persons in a video chat process, and improving voice quality of a video chat.

In the foregoing embodiment, the division module 701 divides the video calling screen into multiple angular domains. In an actual application, there are many manners in which the division module 701 divides the video calling screen into multiple angular domains.

Optionally, in another embodiment of the terminal of the present disclosure, the division module 701 in the foregoing terminal may be further configured to divide the video calling screen into multiple areas according to locations of the participants in the video calling screen such that each participant occupies one area.

In this embodiment, the division module 701 divides the video calling screen according to the locations of the participants such that a direction finally selected for recording corresponds to an actual location of a participant. Effects of reducing background noise and noise of multiple persons in a video chat process, and improving voice quality of a video chat can be better achieved.

Optionally, in another embodiment of the terminal of the present disclosure, the division module 701 in the foregoing terminal may be configured to equally divide the video calling screen into multiple angular domains.

In this embodiment, the division module 701 equally divides the video calling screen such that an amount of calculation that needs to be performed by the terminal can be reduced, thereby improving processing efficiency of the terminal.

It may be understood that the division module 701 may divide the video calling screen in another manner, which is not limited herein.

In the foregoing embodiment, the configuration determining module 702 determines the beam configuration information corresponding to each angular domain. In an actual application, the beam configuration information includes an acoustic source azimuth, a beam direction, and a beam width. The beam configuration information may further include a parameter such as a sampling rate, an inter-microphone distance, or a maximum noise reduction amount, which is not limited herein.

There are also many manners in which the configuration determining module 702 determines the beam configuration information.

Optionally, in another embodiment of the terminal of the present disclosure, the configuration determining module 702 in the foregoing terminal may be configured to calculate, according to the location of each angular domain in the video calling screen, an acoustic source azimuth, a beam direction, and a beam width that correspond to each angular domain.

In this embodiment, the configuration determining module 702 directly calculates beam configuration information according to a location of an angular domain such that the obtained beam configuration information is more accurate.

Optionally, in another embodiment of the terminal of the present disclosure, the configuration determining module 702 in the foregoing terminal may be configured to obtain through matching, according to the location of each angular domain in the video calling screen and preset configuration information, an acoustic source azimuth, a beam direction, and a beam width that correspond to each angular domain.

In this embodiment, the configuration determining module 702 obtains through matching the beam configuration information of each angular domain according to the location of each angular domain and the preset configuration information, thereby further reducing the amount of calculation that needs to be performed by the terminal, and improving the processing efficiency of the terminal.

Figure 8:
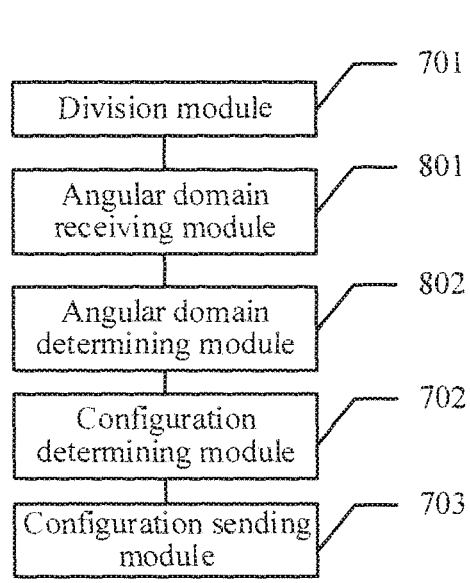
FIG. 8 is another schematic structural diagram of a terminal according to an embodiment of the present disclosure.

In the foregoing embodiment, when the target angular domain is determined, the configuration sending module 703 sends the beam configuration information corresponding to the target angular domain determined by the configuration determining module 702 to the second terminal. In an actual application, the mobile terminal may further receive information about an angular domain selected by a user. Referring to FIG. 8, in another embodiment of the present disclosure, with reference to the FIG. 7, the foregoing terminal further includes an angular domain receiving module 801 configured to receive information about at least one angular domain that is selected by a user from the multiple angular domains, and an angular domain determining module 802 configured to determine, according to the information received by the angular domain receiving module 801, that the selected angular domain is the target angular domain.

In this embodiment, the angular domain receiving module 801 may receive the information about the angular domain selected by the user. The angular domain determining module 802 determines that the selected angular domain is the target angular domain. In this way, only a sound of a direction corresponding to an angular domain required by the user is recorded according to a user requirement.

It may be understood that in an actual application, the angular domain receiving module 801 may further be configured to receive selection information sent by the second terminal. The selection information includes information about the angular domain of a direction in which a sound needs to be recorded, and then the angular domain determining module 802 determines that the angular domain is the target angular domain. Alternatively, there may be another manner of determining the target angular domain, which is not limited herein.

A terminal used as a second terminal according to an embodiment of the present disclosure is described below.

Figure 9:
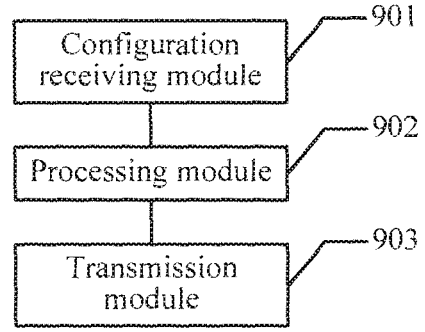
FIG. 9 is another schematic structural diagram of a terminal according to an embodiment of the present disclosure.

Referring to FIG. 9, another embodiment of the terminal according to this embodiment of the present disclosure includes a configuration receiving module 901 configured to receive beam configuration information that is sent by a first terminal and that corresponds to a target angular domain in a video calling screen, where the beam configuration information is an input parameter of a beamforming technology, the video calling screen is a screen that is displayed on the first terminal and that is used to perform video chatting with participants in front of the second terminal, and the target angular domain includes at least one of multiple angular domains in the video calling screen, a processing module 902 configured to perform, according to the beam configuration information, beamforming processing on an audio signal obtained through recording such that signal strength of an audio signal of the target angular domain is enhanced, and signal strength of an audio signal of another angular domain is attenuated in order to obtain a processed audio signal, and a transmission module 903 configured to transmit the audio signal processed by the processing module 902 to the first terminal.

In this embodiment of the present disclosure, the processing module 902 performs, according to beam configuration information that is received by the configuration receiving module 901, that is sent by a first terminal and that corresponds to a target angular domain in a video calling screen, beamforming processing on an audio signal obtained through recording such that signal strength of an audio signal of the target angular domain is enhanced, and signal strength of an audio signal of another angular domain is attenuated, thereby reducing background noise and noise of multiple persons in a video chat process, and improving voice quality of a video chat.

In the foregoing embodiment, the configuration receiving module 901 receives the beam configuration information. In an actual application, the beam configuration information includes an acoustic source azimuth, a beam direction, and a beam width. The beam configuration information may further include a parameter such as a sampling rate, an inter-microphone distance, or a maximum noise reduction amount, which is not limited herein.

In the foregoing embodiment, the processing module 902 performs beamforming processing on the audio signal obtained through recording. In an actual application, there may be multiple specific processing manners.

Optionally, in another embodiment of the terminal of the present disclosure, the terminal may include at least two microphones. The processing module 902 is configured to adjust, according to the beam configuration information, a parameter of an audio signal collected by each microphone such that after audio signals collected by the microphone in the second terminal are synthesized, only the audio signal of the target angular domain exists in order to obtain the processed audio signal.

In this embodiment, the processing module 902 can adjust, according to the beam configuration information, the parameter of the audio signal collected by each microphone such that after the audio signals obtained through recording by the microphones in the second terminal are synthesized, only the audio signal of the target angular domain exists, thereby accurately achieving effects of reducing background noise and noise of multiple persons in a video chat process, and improving voice quality of a video chat.

It may be understood that the first terminal and the second terminal in the present disclosure may be a same terminal, or may be different terminals. That is, one terminal may include all modules of both the first terminal and the second terminal, or two terminals are separately used as the first terminal and the second terminal in different application scenarios or for different application requirements.

Refer to FIG. 10, which is another schematic structural diagram of a terminal 1000 according to an embodiment of the present disclosure, including an input apparatus 1001, an output apparatus 1002, a processor 1003, and a memory 1004 (where there may be one or more processors 1003 in the terminal 1000, and one processor 1003 is used as an example in FIG. 10). In some embodiments of the present disclosure, the input apparatus 1001, the output apparatus 1002, the processor 1003, and the memory 1004 may be connected using a bus or in another manner, and connection using a bus is used as an example in FIG. 10.

It may be understood that the terminal 1000 may be used as a first terminal, or may be used as a second terminal.

With reference to the terminal 1000 shown in FIG. 10, in another embodiment of the terminal according to this embodiment of the present disclosure, when the terminal 1000 is used as the first terminal, an operating instruction stored in the memory 1004 is invoked, and the processor 1003 is configured to perform the steps of dividing a video calling screen into multiple angular domains, where the video calling screen is a screen that is displayed on the first terminal and that is used to perform video chatting with participants in front of a second terminal, determining, according to a location of each angular domain in the video calling screen, beam configuration information corresponding to each angular domain, where the beam configuration is an input parameter of a beamforming technology, and sending beam configuration information corresponding to the target angular domain to the second terminal when a target angular domain is determined such that the second terminal performs, according to the beam configuration information corresponding to the target angular domain, beamforming processing on an audio signal obtained through recording in order to enhance signal strength of an audio signal of the target angular domain, and attenuate signal strength of an audio signal of another angular domain, where the target angular domain includes at least one of the multiple angular domains.

In some embodiments of the present disclosure, the processor 1003 is further configured to perform the step of dividing the video calling screen into multiple areas according to locations of the participants in the video calling screen such that each participant occupies one area, or equally dividing the video calling screen into multiple angular domains.

In some embodiments of the present disclosure, the beam configuration information includes an acoustic source azimuth, a beam direction, and a beam width.

The processor 1003 is further configured to perform the tep of calculating, according to the location of each angular domain in the video calling screen, an acoustic source azimuth, a beam direction, and a beam width that correspond to each angular domain, or obtaining through matching, according to the location of each angular domain in the video calling screen and preset configuration information, an acoustic source azimuth, a beam direction, and a beam width that correspond to each angular domain.

In some embodiments of the present disclosure, the processor 1003 is further configured to perform the step of receiving information about at least one angular domain that is selected by a user from the multiple angular domains, and determining that the selected angular domain is the target angular domain.

With reference to the terminal 1000 shown in FIG. 10, in another embodiment of the terminal according to this embodiment of the present disclosure, when the terminal 1000 is used as the second terminal, an operating instruction stored in the memory 1004 is invoked, and the processor 1003 is configured to perform the steps of receiving beam configuration information that is sent by a first terminal and that corresponds to a target angular domain in a video calling screen, where the beam configuration information is an input parameter of a beamforming technology, the video calling screen is a screen that is displayed on the first terminal and that is used to perform video chatting with the participants in front of the second terminal, and the target angular domain includes at least one of the multiple angular domains in the video calling screen, performing, according to the beam configuration information, beamforming processing on an audio signal obtained through recording such that signal strength of an audio signal of the target angular domain is enhanced, and signal strength of an audio signal of another angular domain is attenuated in order to obtain a processed audio signal, and transmitting the audio signal processed by the processor 1003 to the first terminal.

In some embodiments of the present disclosure, the input apparatus 1001 includes at least two microphones.

The processor 1003 is further configured to perform the step of adjusting, according to the beam configuration information, a parameter of an audio signal collected by each microphone such that after the audio signals collected by the microphones in the second terminal are synthesized, only the audio signal of the target angular domain exists in order to obtain the processed audio signal.

As shown in FIG. 11, an embodiment of the present disclosure further provides a recording system, which is configured to record in a video chat and includes the terminal used as a first terminal 1101 in the embodiment corresponding to FIG. 7, FIG. 8, or FIG. 10, and the terminal used as a second terminal 1102 in the embodiment corresponding to FIG. 9 or FIG. 10.

It may be clearly understood by persons skilled in the art that, for ease and brevity of description, for specific working processes of the foregoing system, apparatuses, and units, refer to corresponding processes in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some screens. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the other approaches, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method comprising:
dividing, by a first terminal, a video calling screen into a plurality of angular domains, the video calling screen is displayed on the first terminal and used to perform video chatting with participants in front of a second terminal, the second terminal comprises at least two microphones;
determining, by the first terminal and according to a location of each angular domain in the video calling screen, beam configuration information corresponding to each angular domain, the beam configuration is an input parameter of a beamforming technology;
sending, by the first terminal, beam configuration information corresponding to a target angular domain to the second terminal when the first terminal determines the target angular domain, the target angular domain comprises at least one of the plurality of angular domains;
receiving, by the second terminal, the beam configuration information from the first terminal corresponding to the target angular domain;
collecting, by at least two microphones, a plurality of audio signals;
adjusting, by the second terminal and according to the beam configuration information, a parameter of the audio signals;
synthesizing by the second terminal, the audio signals to create a synthesized audio signal comprising only the audio signal of the target angular domain; and
transmitting, by the second terminal, the synthesized audio signal to the first terminal.

2. The method according to claim 1, wherein dividing the video calling screen into the plurality of angular domains comprises dividing, by the first terminal, the video calling screen into a plurality of areas according to locations of the participants in the video calling screen such that each participant occupies one area.

3. The method according to claim 2, wherein the beam configuration information comprises an acoustic source azimuth, a beam direction, and a beam width, and wherein determining the beam configuration information corresponding to each angular domain comprises calculating, by the first terminal according to the location of each angular domain in the video calling screen, an acoustic source azimuth, a beam direction, and a beam width corresponding to each angular domain.

4. The method according to claim 2, wherein the beam configuration information comprises an acoustic source azimuth, a beam direction, and a beam width, and wherein determining the beam configuration information corresponding to each angular domain comprises obtaining through matching, by the first terminal according to the location of each angular domain in the video calling screen and preset configuration information, an acoustic source azimuth, a beam direction, and a beam width that correspond to each angular domain.

5. The method according to claim 1, wherein the first terminal determining the target angular domain, comprises:

receiving, by the first terminal, information about at least one angular domain selected by a user from the plurality of angular domains; and determining that the selected at least one angular domain is the target angular domain.

6. The method according to claim 1, wherein dividing the video calling screen into the plurality of angular domains comprises equally dividing, by the first terminal, the video calling screen into the plurality of angular domains.

7. A first terminal comprising:
an input apparatus;
an output apparatus;
a memory;
a processor configured to:
divide a video calling screen into a plurality of angular domains, the video calling screen is displayed on the first terminal and used to perform video chatting with participants in front of a second terminal;
determine, according to a location of each angular domain in the video calling screen, beam configuration information corresponding to each angular domain, the beam configuration is an input parameter of a beamforming technology; and
send beam configuration information corresponding to a target angular domain to the second terminal;
receive a synthesized audio signal from the second terminal, the synthesized audio signal comprises only an audio of the target angular domain based on synthesization of a plurality of collected audio signals; and
a bus configured to couple the input apparatus, the output apparatus, the memory, and the processor.

8. The terminal according to claim 7, wherein the processor is further configured to divide the video calling screen into a plurality of areas according to locations of the participants in the video calling screen such that each participant occupies one area.

9. The terminal according to claim 8, wherein the beam configuration information includes an acoustic source azimuth, a beam direction, and a beam width.

10. The terminal according to claim 7, wherein the processor is further configured to equally divide the video calling screen into the plurality of angular domains.

11. The terminal according to claim 10, wherein the beam configuration information includes an acoustic source azimuth, a beam direction, and a beam width.

12. The terminal according to claim 7, wherein the processor is further configured to calculate, according to the location of each angular domain in the video calling screen, an acoustic source azimuth, a beam direction, and a beam width corresponding to each angular domain.

13. The terminal according to claim 7, wherein the processor is further configured to obtain through matching, according to the location of each angular domain in the video calling screen and preset configuration information, an acoustic source azimuth, a beam direction, and a beam width corresponding to each angular domain.

14. The terminal according to claim 7, wherein the processor is further configured to:
receive information about at least one angular domain selected by a user from the plurality of angular domains; and
determine that the selected angular domain is the target angular domain.

15. A method for recording in a video chatting performed between a terminal A and a terminal B, comprising:
displaying, by the terminal A, an image of three participants in a video calling screen of the terminal A;
dividing the video calling screen into three angular domains according to locations of the three participants in the image, each participant occupies one angular domain;
calculating, by the terminal A, according to information about the three angular domains obtained through division, beam configuration information corresponding to the three angular domains;
determining, by the terminal A, a target angular domain in response to a touching operation on one of the three angular domains;
sending, by the terminal A and to the terminal B, beam configuration information corresponding to the target angular domain;
collecting, by the terminal B, a plurality of audio signals;
adjusting, by the terminal B and according to the beam configuration information, a parameter of the audio signals such that a processed sound comprises only a sound of the target angular domain;
transmitting, by the terminal B, the processed sound to the terminal A; and
receiving, by the terminal A, the processed sound.

16. The method according to claim 15, wherein dividing the video calling screen into three angular domains comprises dividing the video calling screen into a plurality of areas according to the locations of the three participants in the video calling screen such that each participant occupies one area.

17. The method according to claim 15, wherein dividing the video calling screen into three angular domains comprises equally dividing the video calling screen into a plurality of angular domains.

18. The method according to claim 15, wherein the recording comprises capturing audio.

* * * * *